(12) United States Patent
Livingston et al.

(10) Patent No.: US 8,240,962 B2
(45) Date of Patent: Aug. 14, 2012

(54) INTEGRATED SHIPPING FIXTURE AND ASSEMBLY METHOD FOR JOINTED WIND TURBINE BLADES

(75) Inventors: Jamie Livingston, Simpsonville, SC (US); Dirk Jan Kootstra, Beekbergen (NL)

(73) Assignee: General Electric Company, Schenectady, NY (US)

( * ) Notice: Subject to any disclaimer, the term of this patent is extended or adjusted under 35 U.S.C. 154(b) by 770 days.

(21) Appl. No.: 11/966,305

(22) Filed: Dec. 28, 2007

(65) Prior Publication Data

US 2009/0169323 A1     Jul. 2, 2009

(51) Int. Cl.
*B65D 85/68*   (2006.01)
*B61D 3/16*    (2006.01)
*B64C 11/16*   (2006.01)

(52) U.S. Cl. ............................. 410/120; 410/2; 416/202
(58) Field of Classification Search ............. 410/120, 410/44, 45, 34, 53; 33/286, 412, 529
See application file for complete search history.

(56) References Cited

U.S. PATENT DOCUMENTS

| | | | | |
|---|---|---|---|---|
| 4,518,313 | A * | 5/1985 | Jensen et al. | 416/18 |
| 4,732,542 | A * | 3/1988 | Hahn et al. | 416/226 |
| 6,914,930 | B2 * | 7/2005 | Raskin et al. | 372/109 |
| 7,654,799 | B2 | 2/2010 | Eyb | |
| 2004/0174542 | A1 * | 9/2004 | Handman et al. | 356/622 |
| 2005/0031431 | A1 * | 2/2005 | Wobben | 410/45 |
| 2005/0180833 | A1 * | 8/2005 | Almind | 410/2 |
| 2006/0251517 | A1 * | 11/2006 | Grabau | 416/202 |
| 2006/0283029 | A1 * | 12/2006 | Jan et al. | 33/286 |
| 2007/0248431 | A1 * | 10/2007 | Jensen | 410/45 |

* cited by examiner

*Primary Examiner* — Glenn Dayoan
*Assistant Examiner* — Sunsurraye Westbrook
(74) *Attorney, Agent, or Firm* — Dority & Manning, P.A.

(57) ABSTRACT

An integrated shipping and alignment fixture for shipping and aligning a jointed multi-section wind turbine blade is provided. The fixture includes a first shipping fixture supporting a first end of a section of the multi-section wind turbine blade; a second shipping fixture supporting a second end of a section of the multi-section wind turbine blade; supports on the the first shipping fixture and the second shipping fixture for retaining one end of the section of the wind turbine blade; an aligning device for aligning a detached section of the multi-section wind turbine blade with a retained section of the wind turbine blade; and a clamping device for clamping a detached section with a retained section.

15 Claims, 8 Drawing Sheets

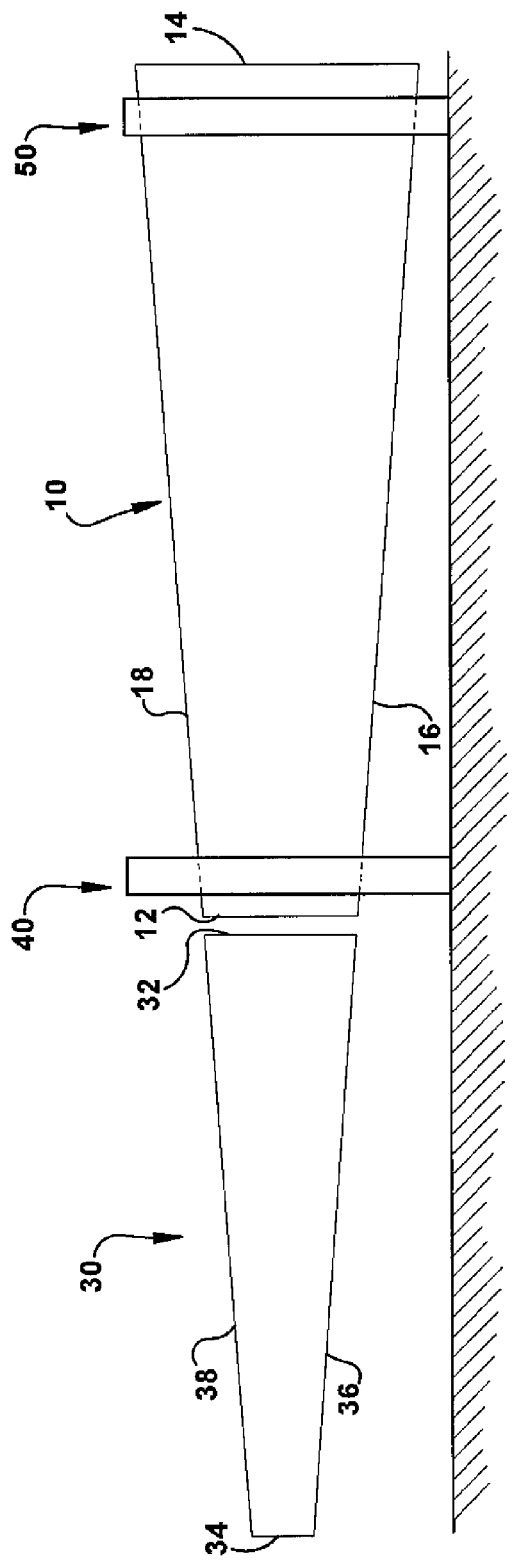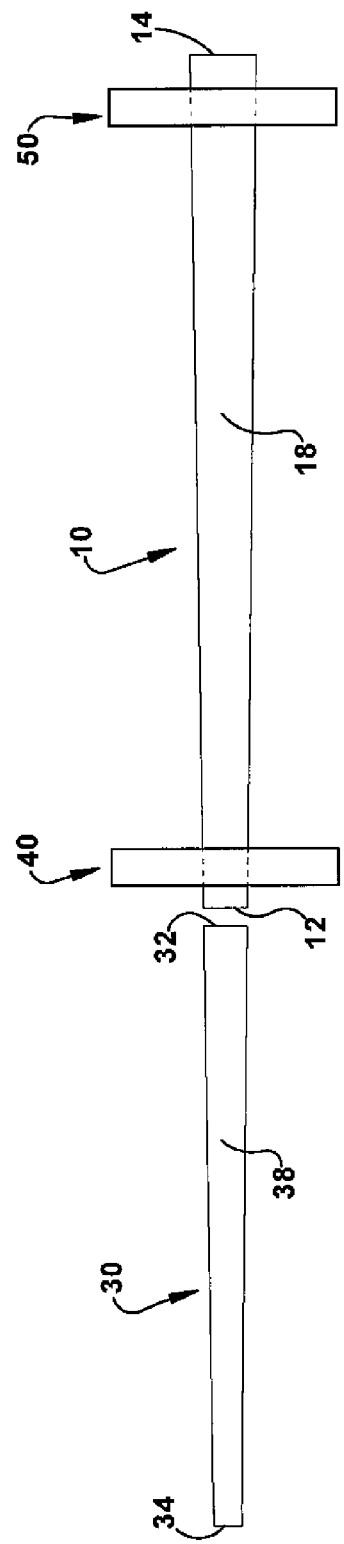

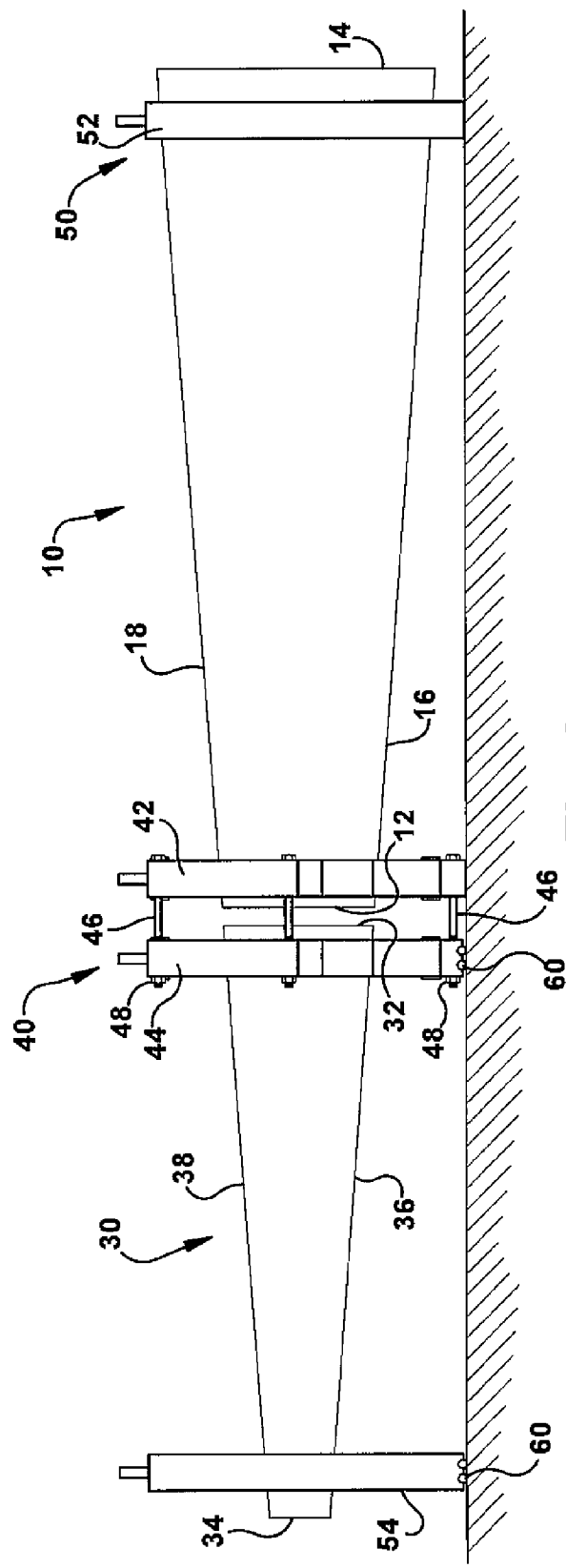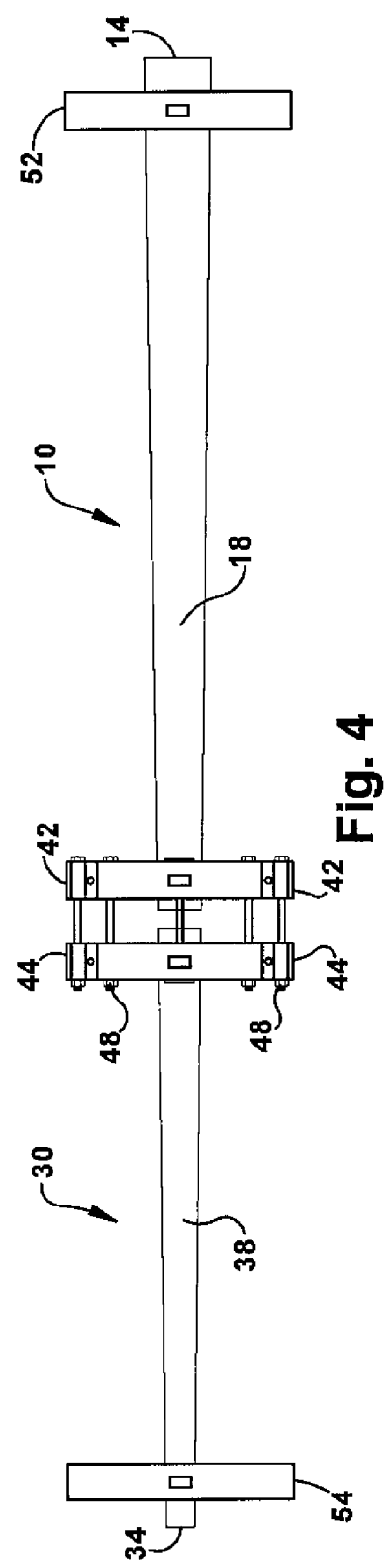
Fig. 3
Fig. 4

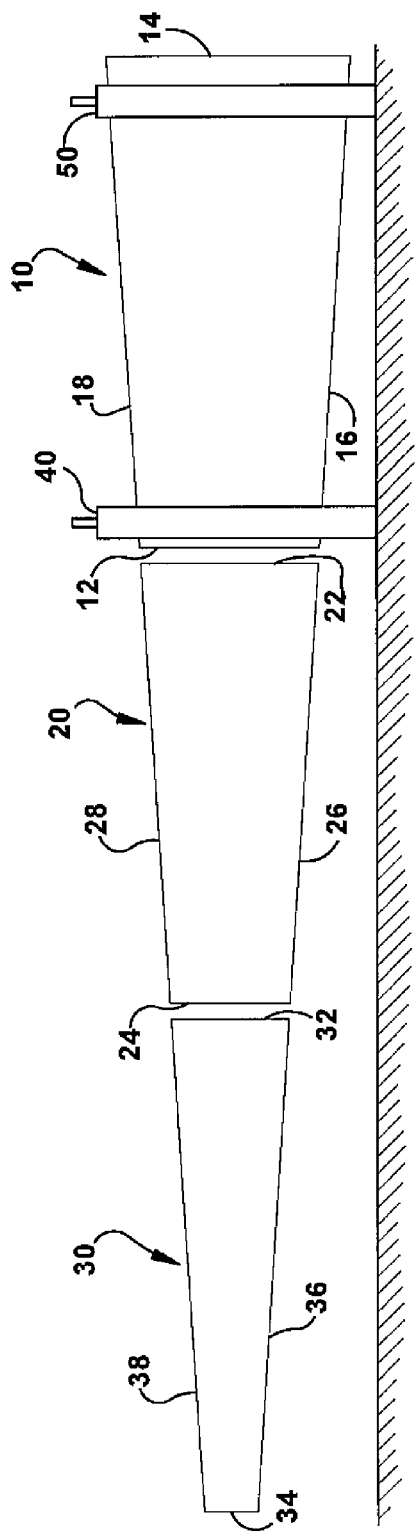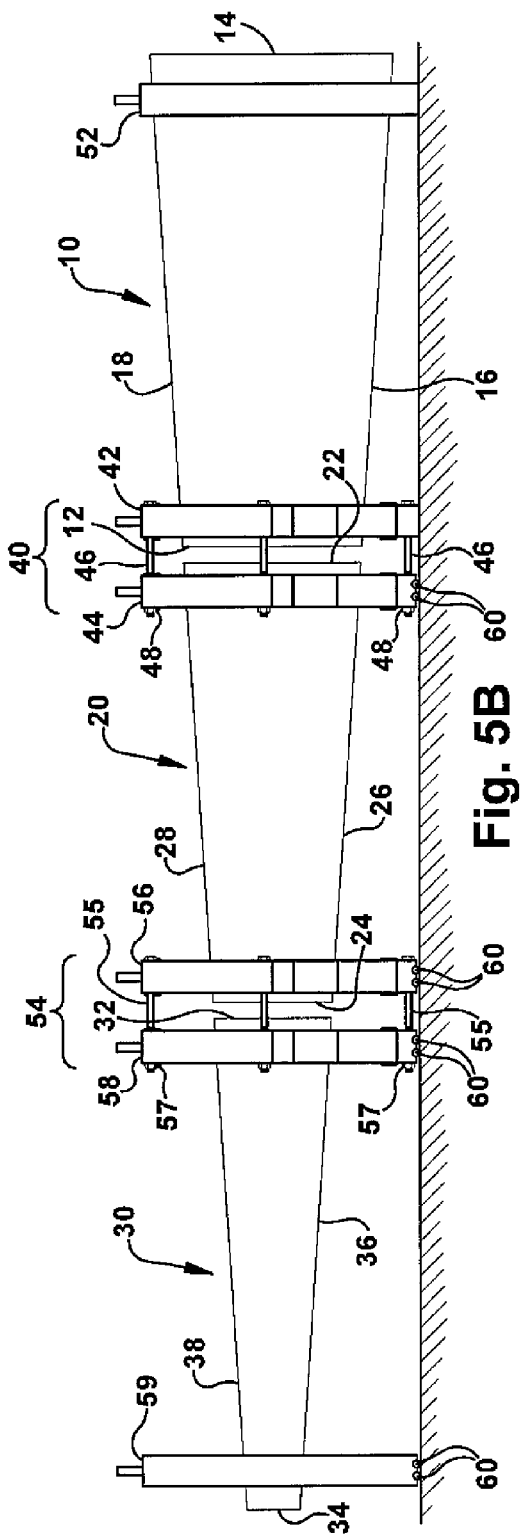

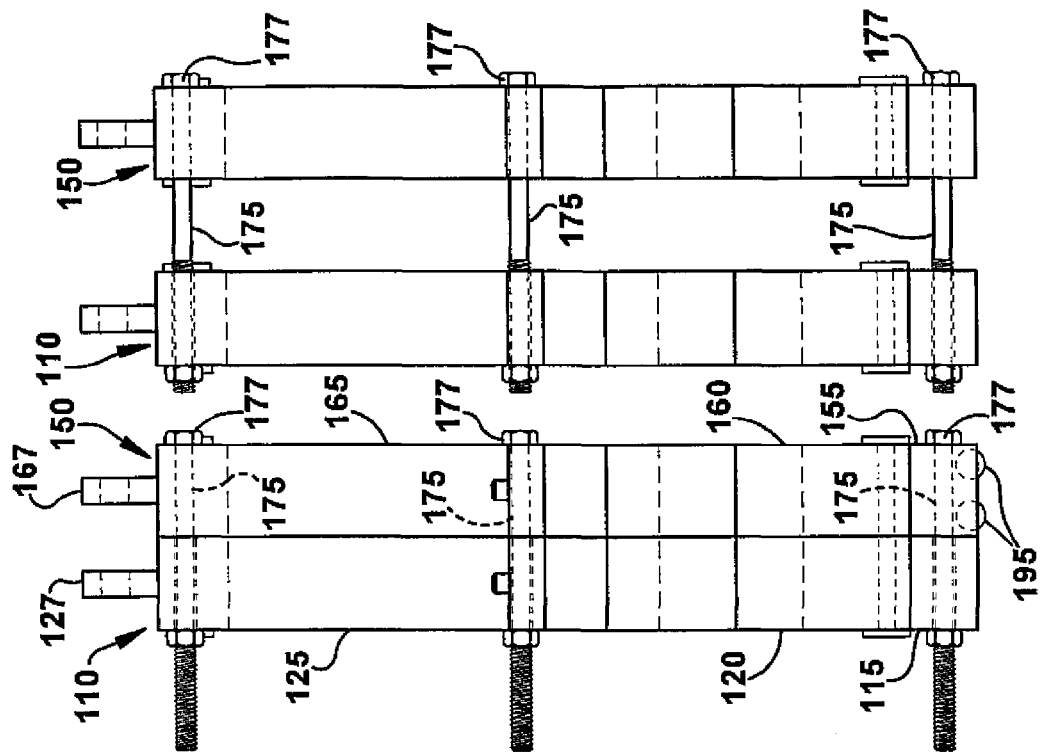
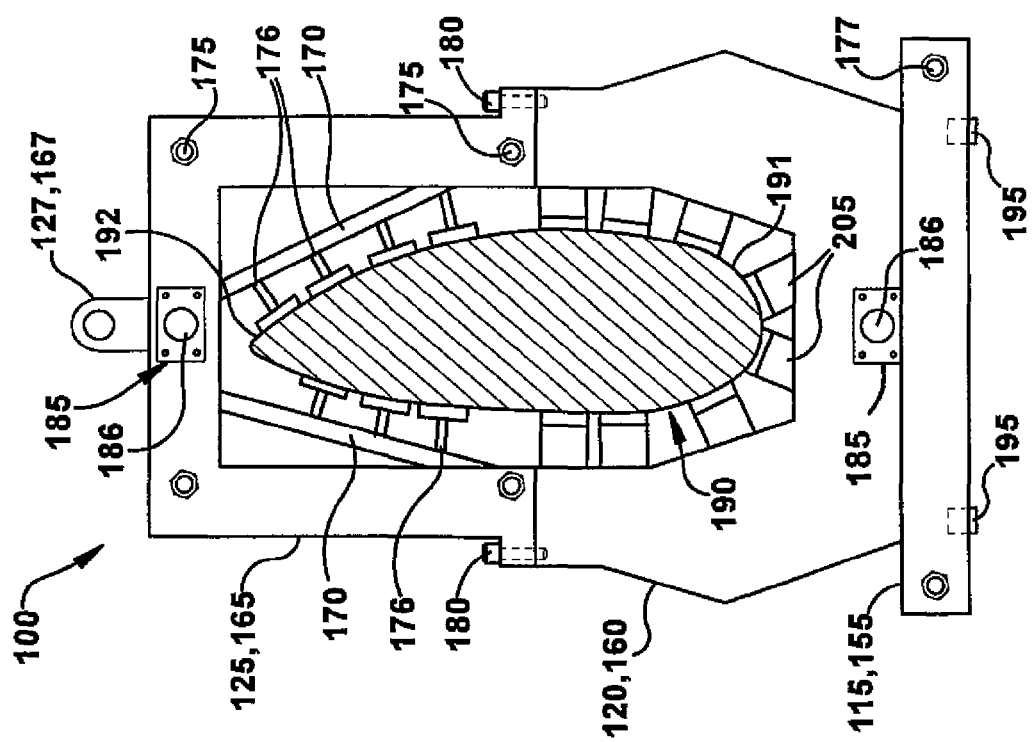

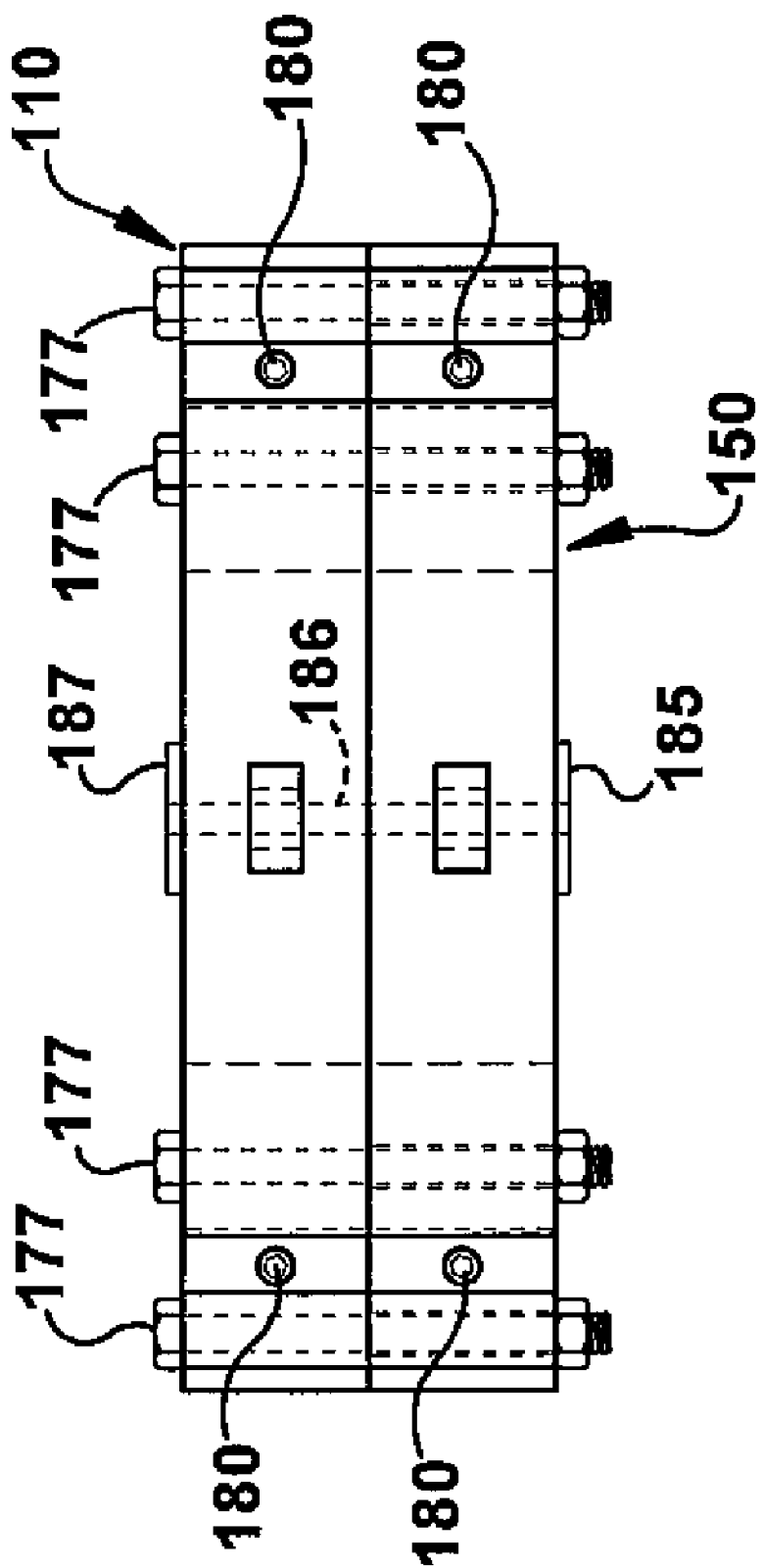

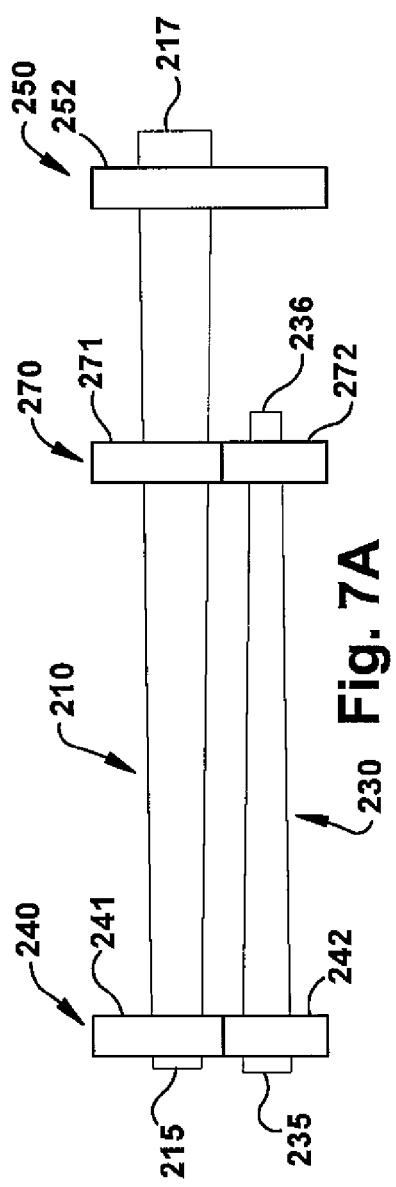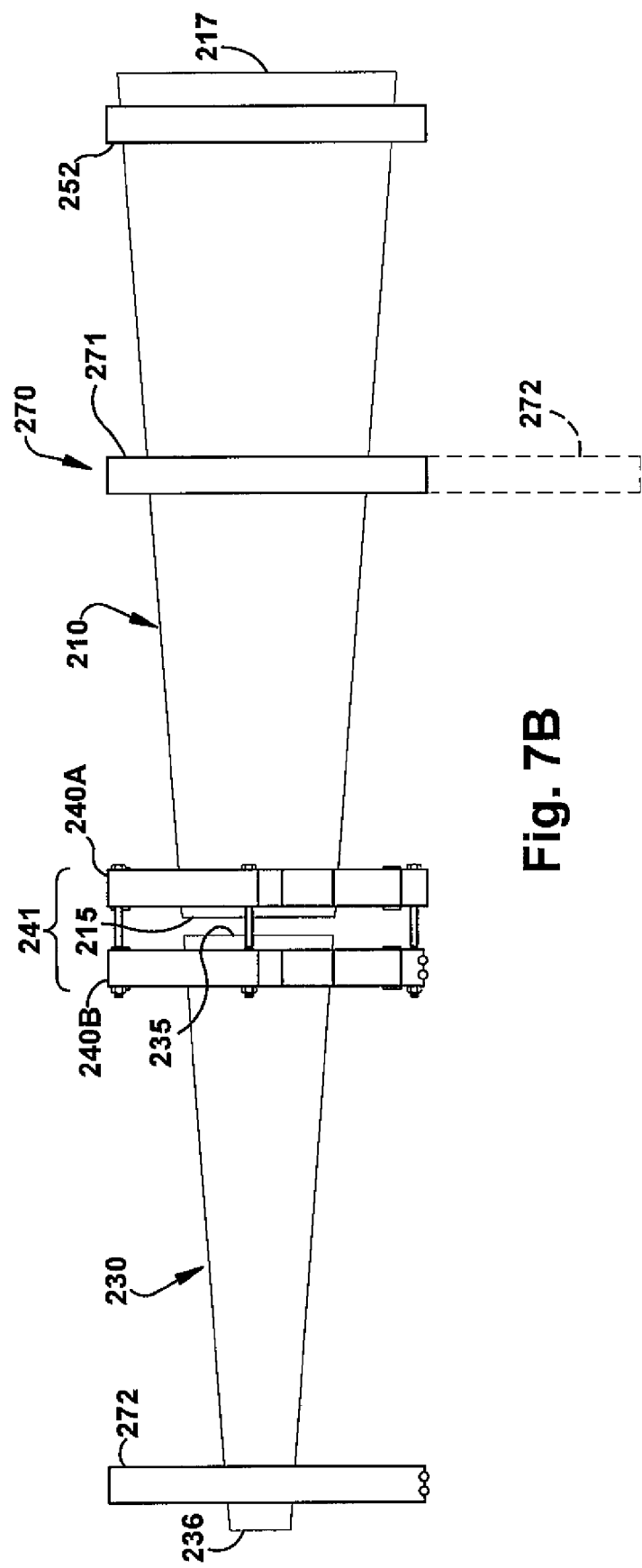

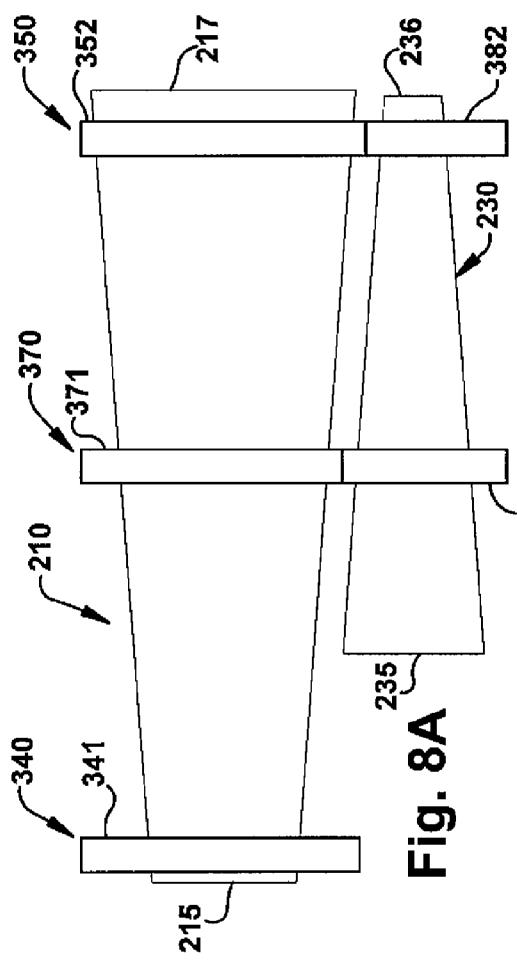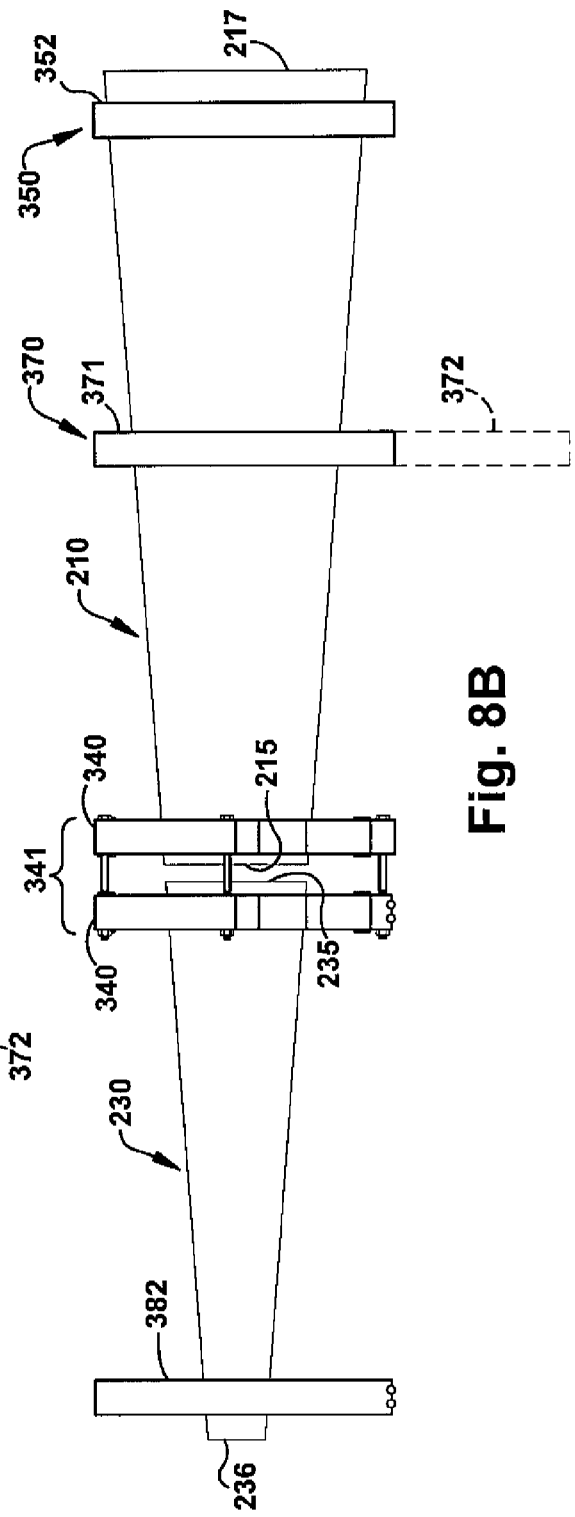

… (1)

INTEGRATED SHIPPING FIXTURE AND ASSEMBLY METHOD FOR JOINTED WIND TURBINE BLADES

RELATED APPLICATIONS

This application is related to a General Electric Company application Ser. No. 11/380,936 by Enno Eyb, filed on Apr. 30, 2006 and entitled "MODULAR ROTOR BLADE FOR A WIND TURBINE AND METHOD FOR ASSEMBLING SAME".

BACKGROUND OF THE INVENTION

The invention relates generally to shipping fixtures and more specifically to a shipping fixture for jointed multi-section wind turbine blades that provides for assembly of the blade sections at the wind turbine site.

In recent years, wind turbines have become increasingly important in power generation. With increased environmental concerns related to fossil fuel power generation, wind power will grow in importance in the mix of providing electrical power. Consequently, more wind turbines will be installed. For economic reasons, it is desirable to increase the installed power per turbine. As the installed power is proportional to the diameter of the turbine rotor, the rotor sizes and turbine sizes become larger. Blade lengths continue to increase to support the higher power requirements per turbine. Typical blade lengths of current designs are up to 50 meters and greater.

Due to the often-isolated location of wind turbine farms, the rotor blades must be transported to the construction site by trucks on normal roads. The large blade size may severally limit the maneuverability of the trucks. Road transport of rotor blades of 50 meters is also very costly. Furthermore, routing of the trucks may be limited since it may be impossible to negotiate sharp turns and other interferences. Extraordinary blade length may also make loading and unloading extremely difficult. Rotor blades may require transport by ship or even helicopters to some locations.

The above-described difficulties have encouraged the development of multi-section blades. While the multi-section blades are smaller than a one-piece blade, they are still long and heavy. Further, the blade sections must be aligned during assembly before clamping the sections together.

Accordingly, there is a need to provide a shipping fixture that will provide for transport of the wind turbine blade sections and then provide a structure for easy assembly of the blade sections.

BRIEF DESCRIPTION OF THE INVENTION

The present invention relates to a shipping fixture and method for improving the transportation of a multi-section equipment piece to an assembly site and facilitating the alignment and assembly of the sections, particularly for jointed multi-section wind turbine blades.

Briefly in accordance with one aspect of the present invention, an integrated shipping and alignment fixture for slipping and aligning multi-section equipment pieces is provided. The fixture includes a first shipping fixture supporting a first end of a section of the multi-section equipment pieces; a second shipping fixture supporting a second end of a section of the multi-section equipment pieces holding means on the the first shipping fixture and the second shipping fixture for retaining one end of the plurality of multi-section support pieces; and aligning means for aligning a detached section of the multi-section equipment piece with a retained multi-section equipment piece.

In accordance with a second aspect of the present invention, an integrated shipping and alignment fixture for shipping and aligning a multi-section wind turbine blade is provided. The fixture includes a first shipping fixture supporting a first end of a section of the multi-section wind turbine blade; a second shipping fixture supporting a second end of a section of the multi-section wind turbine blade; holding means on the the first shipping fixture and the second shipping fixture for retaining one respective end of the section of the wind turbine blade; and aligning means for aligning a detached section of the multi-section wind turbine blade with a retained section of the wind turbine blade.

A further aspect of the present invention provides a method for shipping and aligning sections of a multi-section wind turbine blade on an integrated shipping and aligning fixture, which includes a first shipping fixture with a fully detachable support section and a second shipping fixture with a partially detachable support section.

The method includes mounting individual sections of the multi-section wind turbine blade, including a root section and a tip section, on the first shipping fixture and a second shipping fixture, wherein the individual sections require alignment for assembly into a unit and shipping the integrated shipping and alignment fixture to an assembly destination for the wind turbine blade. The tip section of the wind turbine blade is detached from the fixture. The fully detachable support section is fully detached from the first shipping fixture and positioned to mount the tip portion of the tip piece. The partially detachable support section is partially detached from the second shipping fixture to support the connecting end of the tip section.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIG. 1 illustrates a side view of a root section of a wind turbine blade mounted on an embodiment of a first shipping fixture and a second shipping fixture;

FIG. 2 illustrates a top view of the wind turbine blade sections mounted on an embodiment of the first shipping fixture and the second slipping fixture;

FIG. 3 illustrates a side view of wind turbine blade sections arranged for assembly on an embodiment of detached shipping fixtures;

FIG. 4 illustrates a top view of the wind turbine blade sections arranged for assembly on an embodiment of the detached shipping fixtures;

FIG. 5A illustrates a side view of a root section of a multi-section wind turbine blade mounted on a second embodiment of a first shipping fixture and a second shipping fixture before expanding the shipping fixtures to mount a mid-section and a tip section;

FIG. 5B illustrates the second embodiment of the detached shipping fixtures arranged for assembly of the multi-section wind turbine blade;

FIGS. 6A-6D, respectively, illustrate a front elevation view, two side elevation views and a top view for an exemplary first shipping fixture with a fixed support and a partially detachable support for a root section and a tip section of a wind turbine blade;

FIGS. 7A-7B illustrates top views for one embodiment for a side-by-side arrangement for shipping fixtures holding a root section and a tip section for a wind turbine blade;

FIGS. 8A-8B illustrate top views of a second embodiment for a side-by-side arrangement for shipping fixtures holding a root section and a tip section for a wind turbine blade.

DETAILED DESCRIPTION OF THE INVENTION

Figure 9:
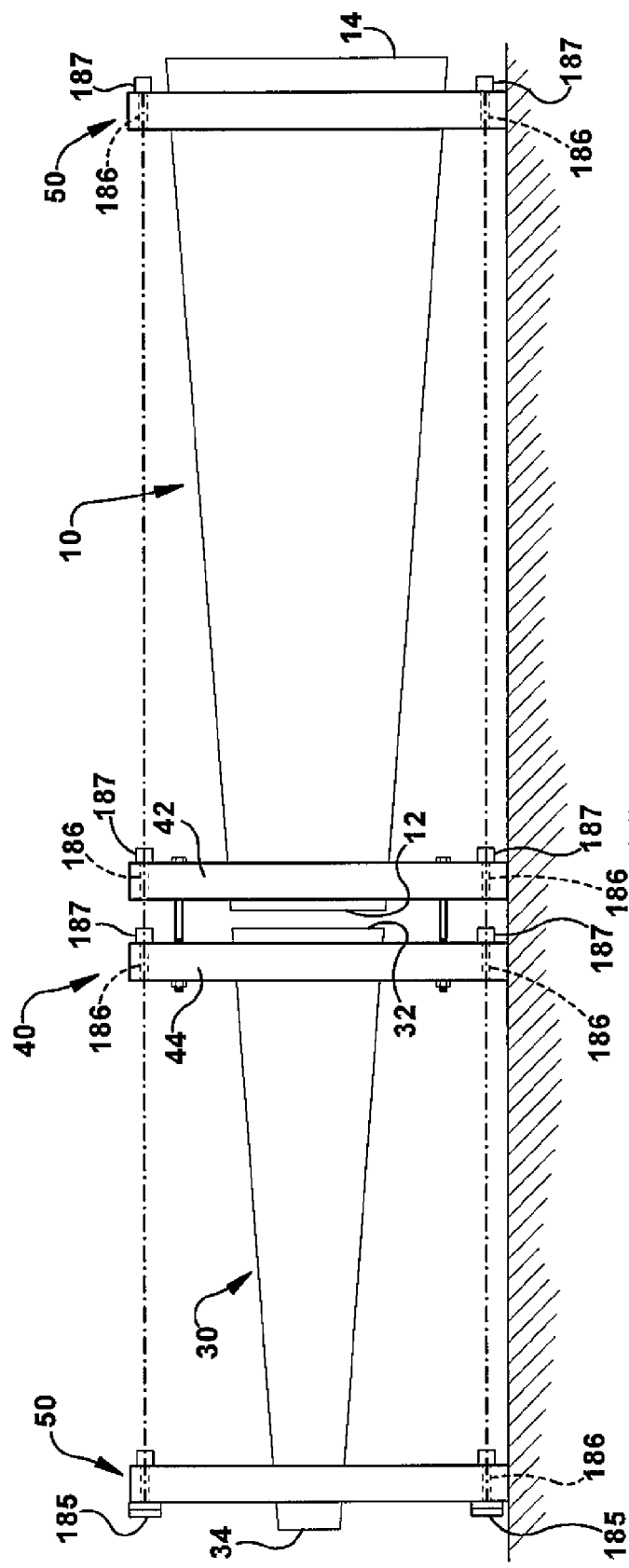
FIG. 9 illustrates an exemplary arrangement for performing a laser alignment of the integrated shipping fixture assembly configuration for clamping of the blade sections.

The following embodiments of the present invention have many advantages, including facilitating transport to an assembly site and ease of assembly at the assembly site for sections of multi-section equipment pieces, such as sections of a multi-section blade for a wind turbine.

Large equipment components such as wind turbine blades often require transport to assembly locations. Due to the size of the component, they often are provided as jointed multi-section equipment pieces to facilitate transport. At the destination, the multi-section equipment pieces must be assembled. The assembly often requires alignment of the multi-section equipment pieces before they can be fastened together. One aspect of the present invention facilitates the transport of such multi-section equipment pieces and provides alignment features to facilitate assembly.

The present invention may include a plurality of shipping fixtures. The plurality of shipping fixtures may include a first shipping fixture and a second shipping fixture. One or more of the sections of the multi-section equipment may be supported on the shipping fixtures for transporting. The first shipping fixture may support a first end of the multi-section equipment sections. The second shipping fixture may support a second end of the multi-section equipment sections. Other embodiments of the inventive shipping fixtures may provide for the support and alignment of more than two blade sections.

In an example of a multi-section equipment piece with two sections, the individual equipment sections may have a common connecting or mating end. Here, the first shipping fixture may support the mating end of the first equipment section. The second shipping fixture may support the opposing end of the first equipment section. The second equipment section may be transported on separate shipping fixtures or may alternatively be supported, for example, at the connecting end by one shipping fixture and at the opposing end by the other shipping fixture.

If both equipment sections are mounted on the shipping fixture, one equipment section will need to be removed for assembly to the other equipment section at the connecting ends. Often times the first equipment section and the second equipment section may be of different size and weight. In some instances it may be advantageous for the heavier or longer equipment piece to remain mounted on the shipping fixtures for assembly while a lighter or shorter equipment piece is moved into a position to facilitate assembly. More specifically, the equipment section being detached from the equipment will be moved so its connecting end is placed adjacent to the connecting end of the equipment section being retained in the shipping fixture. Due to size and weight of the detached section, a lifting device or crane may be employed to raise the removed section from the shipping fixtures and relocate it for assembly.

The removed equipment section may be supported for assembly at its connecting end and opposing end. One support may be provided in proximity to the connecting end support for the retained equipment section. The other support will be provided away from the connection point at the opposing end of the removed section.

The shipping fixtures may include partially-detachable and fully-detachable elements to facilitate the assembly. In one embodiment of the invention, the first shipping fixture provided for the mating end of multi-section pieces may include a fixed support and a partially-detachable support. During shipping, the fixed support and the partially detachable support may be held in place by fastening means known in the art. At the assembly site, the fixed support will continue to hold the mating (connecting) end of at least one equipment section, while the partially detachable support may be unfastened in a manner to permit movement relative to the fixed support. Such movement allows the partially detachable support to separate from the fixed support to provide support for the connecting end of the removed equipment section. However, by maintaining a physical connection between the partially detached support and the fixed support, the two supports can be maintained in alignment, thereby providing alignment between the abutted connecting end of the retained equipment section and the removed equipment section. The second shipping fixture for the opposing end of retained equipment section may include a fixed support and a fully detachable support. During shipping, the fixed support and the detachable support may be held in place by fastening means known in the art.

At the assembly site, the fixed support will continue to hold the retained equipment sections. The fully detachable support may be moved into position to support the opposing end of the removed equipment section and to position the opposing end so as to permit the connecting end of the removed section on the partially detachable support of the first shipping fixture to be placed in alignment with the connecting end of the retained section. Because the second equipment section must be moved to clamp to the first equipment section during assembly, it is desirable that the fully detached support and the partially detachable support include means to facilitate movement of the second equipment section toward the first equipment section. Such means may include wheels, rollers or the like mounted underneath the body of the equipment section.

FIGS. 1-4 illustrate views of an embodiment of the inventive shipping fixture for assembling a multi-section wind turbine blade with a root section and a tip section. FIG. 1 illustrates a side view of a root section 10 mounted on a first shipping fixture 40 and a second shipping fixture 50. A separate tip section 30 section is oriented with its connecting end 32 adjacent to the connecting end 12 of root section 10. The first shipping fixture 40 supports the connecting end 12 of the root section 10. The second shipping fixture 50 supports the opposing end 14 of the root section 12. The larger and heavier leading edge 16 for the root section 10 may be mounted on a lower part of the shipping fixtures, while the trailing edge 18 is mounted on an upper part of the shipping fixtures. The leading edge 36 and the trailing edge 38 for the tip section 30 may be similarly oriented. FIG. 2 illustrates a top view of the wind turbine blade sections mounted on an embodiment of the first shipping fixture and the second shipping fixture.

FIG. 3 illustrates a side view of wind turbine blade sections arranged for assembly on an embodiment of the detached shipping fixtures. The first shipping fixture 40 includes a fixed support 42 and a partially-detachable support 44, connected by connecting members 46, with the partially-detachable support 44 extended from the fixed support. Alignment between the fixed support 42 and the partially-detachable support 44 is maintained by the connecting members 46. The fixed support 42 provides support for the connecting end 12 of the root section 10 and the partially detachable support 44 provides support for the connecting end 32 of the tip section 30. The connecting end 32 of the tip section 30 and the connecting end 12 and the root section 10 are maintained in alignment though the positioning of the connecting ends within the first shipping fixture 40. The second shipping fixture 50 includes fixed support 52 and fully detachable support 54. The fully detachable support 54 is unfastened from the fixed support 52 and moved into position to support the opposing end 34 of the tip section 30. Clamping member 48 may be used on connecting members 36 to retract partially detachable support 44 towards fixed support 42, thereby bringing connecting end 32 of tip section 30 in contact with connecting end 12 of root section 12 and allowing the sections to be clamped together. Rollers 60 may be provided under the partially detachable support 44 and the fully detachable support 54 to permit the tip section 30 to be moved and clamped to the root section 10.

The clamping member 48 may include a simple bolting arrangement for drawing the tip section 30 and the root section 10 together. The clamping member may also include jackscrews or other such devices to facilitate the clamping.

FIG. 4 illustrates a top view of the sections of a wind turbine blade arranged for assembly on the detached shipping fixtures.

The shipping fixtures may include a bed, a cradle, a roof and support elements. The bed element may be a solid floor foundation connected to the bottom of the cradle element by fasteners. The bed element may be individual to each of the first shipping fixture and the second shipping fixture or may be common to both. The cradle element may include an upward facing open recess for accepting one end of the equipment section. Within the open recess, support elements may be provided to support, cushion and position the end of the equipment section. Support elements on the fixed support will provide support, cushioning and positioning for the first equipment piece. Support elements on the detachable supports will provide support, cushioning and positioning for the second equipment piece. The roof may include a downward facing recess that accepts an upper end of the first equipment piece. The roof may include further support elements for supporting, cushioning and positioning of the first equipment piece. The roof may include a downward facing surface that may abut an upward facing surface of the cradle, incorporating fasteners to attach the roof to the cradle, thereby firmly fixing the equipment piece in place for transport. Shipping fixture may further include lifting lugs on one or both of the fixed support and the detachable support to permit setup of the supports for accepting the equipment sections.

General Electric Company application Ser. No. 11/854,867 by Livingston et al. filed on Sep. 13, 2007 and entitled "JIG AND FIXTURE FOR WIND TURBINE BLADE", describes an apparatus and method for vertical alignment of leading edge and trailing edge sections of a wind turbine blade. Livingston further describes a support structure within the jig and fixture for supporting the blade, including u-shaped arms, releasable fasteners and suction cups that may be used for supporting, cushioning and positioning the blade sections. Embodiments may incorporate use of these devices or other devices known in the art for supporting cushioning and positioning the blade sections. Further, the shipping fixtures may include roller elements for the bed section, particularly the partially detachable and detachable sections, thereby facilitating clamping of the blade sections.

As an alternative, the first shipping fixture may provide a fixed support and a fully detachable support. Alternate provisions are made in this case to place such a fully detachable supports in a position to provide for alignment of the connecting ends of equipment sections being joined.

Further, it should be recognized that such a shipping fixture may accommodate additional sections by providing additional detachable elements from the first and/or second shipping fixtures that facilitate alignment, for example between connecting ends of a mid-section piece and a tip piece. In this instance support is provided at the connecting ends of the root section and the mid-section, at the connecting end of the mid-section and the tip section, and at the tip end of the tip section.

FIGS. 5A-5B illustrate a representation of a second embodiment of the inventive shipping fixture for shipping and assembling a multi-section wind turbine blade with a root section, a mid section and a tip section. The multi-section wind turbine blade includes root section 10, mid-section 20 and tip section 30.

FIG. 5A illustrates a side-view of a root section 10 mounted on a first shipping fixture 40 and a second shipping fixture 50. The separate mid section 20 section is shown oriented with its connecting end 22 adjacent to the connecting end 12 of root section 10 and opposing end 24 facing away from the root 10. The separate tip section 30 is shown oriented with connecting end 32 facing the mid section 20. The first shipping fixture 40 supports the connecting end 12 of the root section 10. The second shipping fixture 50 supports the opposing end 14 of the root section 12. The larger and heavier leading edge 16 for the root section 10 may be mounted on the underside of the shipping fixtures, while the trailing edge 18 may be mounted on the upper side of the shipping fixtures. The leading edge 26 and the trailing edge 28 for the mid section 20 and leading edge 36 and the trailing edge for the tip section 30 may be similarly oriented. The mid-section 20 and the tip-section 30 may be transported in separate shipping fixtures (not shown) from that used for the root section 10, or alternatively may, one or both, be shipped with the root section in a wider fixture (not shown) where the span of the sections are supported in parallel cradle elements (not shown).

FIG. 5B illustrates a side view of shipping fixtures arranged for assembly of the wind turbine blade. The first shipping fixture 40 includes a fixed support 42 and a partially-detachable support 44, connected by connecting members 46, with the partially-detachable support 44 extended from the fixed support. Alignment between the fixed support 42 and the partially-detachable support 44 is maintained by the connecting members 46. The fixed support 42 provides support for the connecting end 12 of the root section 10 and the partially detachable support 44 provides support for the connecting end 22 of the mid section 20. The end 22 of the mid section 20 and the connecting end 12 and the root section 10 are maintained in alignment though the positioning of the connecting ends within the first shipping fixture 40. The second shipping fixture 50 includes fixed support 52 and fully detachable support 54 and fully detachable support 59. The fully detachable supports 54 and 59 may be unfastened from the fixed support 52. Fully detachable support 54 is moved into position to support the end 24 of the mid section 20 with support element 56 and the connecting end 32 of the tip section 30 with support element 58. Support elements 56 and support element 58 are connected and maintained in alignment through connecting members 55. Fully detachable support 59 is positioned to provide support to the tip end 34 of tip section 30. Tightening member 57 may be used on connecting members 36 to retract partially detachable support element 58 towards fixed support element 56, thereby bringing connecting end 32 of tip section 30 in contact with end 24 of mid section 20 and allowing the sections to be clamped together.

Tightening members 48 may be used on connecting members 46 to retract partially detachable support element 44 towards support element 42, thereby bringing end 22 of mid section 20 into contact with end 12 of root section 10. Wheels or roller units 60 may be provided on the shipping fixtures to facilitate movement of the detachable support elements such as 44, 56, 58 and 50 to assist in clamping.

FIGS. 6A-6D, respectively, illustrate a front elevation view, side elevation views and a top view for an exemplary first shipping fixture with a fixed support and a partially detachable support for a root section and a tip section of a wind turbine blade. A first shipping fixture 100 may include the fixed support 110 and a partially detachable support 150. The fixed support 110 may include a bed 115, a cradle 120 and a roof 125. The partially detachable support 150 includes a bed 155, a cradle 160, and a roof 165. During slipping, the fixed support 110 and the partially detachable support 150 may be fastened together by connecting members 175 or other means known in the art. For shipping, the blade section 190 may be oriented in the fixture with the leading edge facing down and the trailing edge. With the roof section removed, the blade section is lowered into the cradle to sit on positioning elements 205. With the blade section in place on the cradle 120, the roof 125 may be lowered onto the cradle 120 and fastened in place with fasteners 180. Lifting lug 127 may be provided for raising and lowering for repositioning the entire shipping fixture 100. The roof 125 may include a plurality of struts 170 supported at both ends by the roof 120. The struts further support positioning elements 176 conformed to the shape of the blade section 190. The positioning elements may be adjustable for tightening the blade section 190 in place and for fine lateral and vertical alignment of the blade section in preparation for clamping to an adjacent blade section. FIG. 6B illustrates a side elevation view of the fixed support 110 and the partially detachable support 150 separated, as represented in FIG. 4, in preparation for clamping two adjacent blade sections together. Clamping elements 177 may be used to tighten down on connecting members 175 to cause the connecting end of blade sections to be clamped together. FIG. 6C illustrates a side elevation view of the first shipping fixture 100 with the fixed support 110 and the partially detachable support 150 clamped together.

FIG. 9 illustrates an exemplary arrangement of a structure for performing a laser alignment of the integrated shipping fixture assembly configuration for clamping of the blade sections. A laser sighting device (with source) 185 is placed on one or more laser sighting through hole locations 186 on a support member at one end of the supported tip section/root section. For one embodiment of the laser sighting arrangement, the laser sighting device 185 may be located at the top and the bottom of the support fixtures 42, 44, 52, 54. At least one or more through holes 186 (at corresponding locations to those of the end support member) are provided on support members between the one end with the laser source 185 and the support member 50 at the second end. Laser targets 187 may be provided at the intermediate support members 42, 44 and at the support member on the opposing end of the blade combination. The support members, preferably on the tip section, may be adjusted vertically and laterally in accordance with the laser targeting to provide for fine alignment between the connecting end of the blade tip section and the blade root section. Placement locations for the laser sighting arrangement on a support member is illustrated in FIGS. 6A and 6D FIGS. 7A-7B and 8A-8B illustrate top views of side-by-side arrangements for embodiments of inventive shipping fixtures holding a root section and a tip section for a wind turbine blade. A first embodiment of the side-by-side arrangement is illustrated in FIG. 7A. A first shipping fixture 240 and a second shipping fixture 250 are provided in proximity to the ends of root section 210. The first shipping fixture 240 provides a cradle 241 for the connecting end 215 of root section 210 and cradle 242 for the connecting end 235 of tip section 230 of wind turbine blade 200. The second shipping fixture 250 includes a cradle 252 for the root end 217 of the blade root section 210. Further, a third shipping fixture 270 provides a cradle 271 for support of the middle of blade root section 210 and a cradle 272 for the tip end 236 of tip section 230. In the first embodiment, the first shipping fixture 240 may also provide the partially detachable support for supporting the connecting end 235 of the tip section 230 in proximity to the connecting end 215 of the root section, and the third shipping fixture 270 may provide the fully detachable support for the tip end 215, and a cradle 272 for the connecting end 215 of the blade tip section.

FIG. 7B illustrates the wind turbine blade sections arranged for alignment and clamping according to the first embodiment of the side-by-arrangement. The cradle 241 of the first shipping fixture 240 has been expanded into a first support section 240A for supporting the connecting end 215 of blade root section 210 and a second support section 240B for supporting the connecting end 235 of blade tip section 230, in a manner as previously described in detail with respect to FIGS. 6A-6D. The third shipping fixture 270 has been expanded to separate out a fully detachable cradle unit 272 to support the tip end 236 of blade tip section 230. The individual cradle units provide support and alignment for the root section 210 and the tip section 230 during clamping.

A second embodiment of the side-by-side arrangement for a shipping fixture for wind turbine blades is illustrated in FIG. 8. A first fixture 340, a second fixture 350 and a third fixture 370 are provided. The first shipping fixture 340 and the second shipping fixture 350 are provided in proximity to the ends of root section 210. The first shipping fixture 340 provides a cradle 341 for the connecting end 215 of root section 210. The second shipping fixture 350 includes a cradle 352 for the root end 217 of the blade root section 210 and fully detachable cradle 382 for tip end 236 of blade tip section 230. Further, a third shipping fixture 370 provides a cradle 371 for support of the middle of blade root section 210 and a cradle 372 for the connecting end 235 of tip section 230. In this second embodiment for the purpose of supporting and aligning the blade sections in preparation for clamping, the cradle 341 of the first shipping fixture 340 may also provide a partially detachable support 340B for supporting the connecting end 235 of the tip section 230 in proximity to the connecting end 215 of the root section. The cradle 341 of the first shipping fixture 340 also provides fixed support 340A for the connecting end 12 of root blade section 10. The second shipping fixture 350 may provide the fully detachable support for the tip end 215, including a cradle 382 for the tip end 236 of the blade tip section.

Further with respect to both embodiment of the shipping fixtures, the individual cradle units supporting the blade sections may include alignment features including a laser sighting system, previously described with respect to FIGS. 6A-6D and FIG. 9.

A method is provided for shipping and aligning sections of a multi-section wind turbine blade on an integrated shipping and aligning fixture including a first shipping fixture with a fully detachable support section and a second shipping fixture with a partially detachable support section.

The method addresses shipment of individual blade sections, including a tip section and a root section, where the tip section and the root section must be aligned for assembly into a blade unit. In preparation for shipping, the individual sections of the multi-section wind turbine blade, are mounted on a first shipping fixture and a second shipping fixture. The first shipping fixture may support the connecting end of the root section. The second shipping fixture may support the opposing end of the root section. The tip section may be mounted on a separate fixture. Alternatively the tip section may be mounted on one of the first shipping fixture and the second shipping fixture and the other end of the tip section may be mounted on a third shipping fixture, as illustrated in FIGS. 7A, 7B and 8.

The integrated shipping and alignment fixture, loaded with the blade section, is shipped to an assembly destination for the wind turbine blade. The tip section is removed by crane or other lifting means from its separate fixture or the integrated shipping fixture. The first shipping fixture is then prepared for accepting the tip section by unfastening the detachable support (full or partially detachable) from the fixed support. In the case of a partially detachable support, the support is fully extended from the fixed support into a position that provides for placement of the connecting end of the tip section in alignment with connecting end of the root section. In the case of a fully detachable support, the support is moved to a position that provides for placement of the connecting end of the tip in alignment with the connecting end of the root section.

The fully detachable support from the first shipping fixture is unfastened from the fixed support. The fully detachable support is positioned at the mounting location for the tip end (opposing end) of the tip section. The tip section is then mounted on the above-described detachable supports. The placement of the connecting end of the tip section and the connecting end of the root section on their respective supports locates connecting elements of the adjoining sections abutted in close alignment. The procedure may further include a step of laser sighting through targets on the fully detachable support for the tip end, and at least one of the partially detachable support for the tip section, the first fixed support fixture for the root section and the second support fixture for the root section. The supports for blade tip section may be adjusted as necessary, and according to the laser sighting if employed, to establish a fine alignment between the ends of the tip section and the root section. The tip section and the root section are then clamped together.

While various embodiments are described herein, it will be appreciated from the specification that various combinations of elements, variations or improvements therein may be made, and are within the scope of the invention.

The invention claimed is:

1. An integrated shipping and alignment fixture for a jointed multi-section wind turbine blade, the fixture comprising:
    a first fixture supporting a first end of a first section of the multi-section wind turbine blade, the multi-section wind turbine blade comprising the first section and a second section detached from the first section;
    a second fixture supporting a second end of the first section of the multi-section wind turbine blade;
    holding means on the first fixture and on the second fixture for retaining the respective first end and second end of the first section of the wind turbine blade; and
    aligning means for aligning the detached second section of the wind turbine blade with the retained first section of the wind turbine blade.

2. The integrated shipping and alignment fixture for the multi-section wind turbine blade according to claim 1, wherein holding means on the first fixture and the second fixture are conformed to retain cross-sections for associated ends of individual sections of the multi-section wind turbine blade.

3. The integrated shipping and alignment fixture for the multi-section wind turbine blade sections according to claim 2, wherein the first fixture includes a completely detachable support member and the second fixture comprises a partially detachable support member.

4. The integrated shipping and alignment fixture for the multi-section wind turbine blade according to claim 3, wherein the partially detachable support member comprises:
    a first support member for a mating end of the first section of the wind turbine blade; and
    a second support member for a mating end of the second section of the wind turbine blade.

5. The integrated shipping and alignment fixture for the multi-section wind turbine blade according to claim 4 wherein the fully detachable support member comprises:
    a first support member for a non-mating end of the first section of the wind turbine blade; and
    a second support member for the opposing end of the second detached wind turbine blade.

6. The integrated shipping and alignment fixture for the multi-section wind turbine blade according to claim 5 wherein the fully detachable support member comprises:
    a first support member for a non-mating end of the first section of the wind turbine blade; and
    a second support member for the opposing end of the detached second section of the wind turbine blade.

7. The integrated shipping and alignment fixture for the multi-section wind turbine blade according to claim 5 wherein the partially detachable support member comprises:
    means to clamp detached sections of the wind turbine blade to their mating sections.

8. The integrated shipping and alignment fixture for shipping and aligning the multi-section wind turbine blade according to claim 4 wherein the fully detachable support member comprises:
    a first support member for a non-mating end of the first section of the wind turbine blade;
    a second extendable support member including a first part and a second part, wherein the first part provides support for a second mating end of the second section of the wind turbine blade and a second part provides support for the mating end of a third section of the wind turbine blade; and
    a third support member for an opposing end of the third section of the wind turbine blade.

9. The integrated shipping and alignment fixture for the multi-section wind turbine blade according to claim 8 wherein at least one of the extendable support member and the partially detachable support member comprises:
    means to align detached sections of the wind turbine blade to their mating sections.

10. The integrated shipping and alignment fixture for the multi-section wind turbine blade according to claim 9, wherein the means to align detached sections of the wind turbine blade to their mating sections comprises:
    a laser targeting arrangement for alignment of the blade sections.

11. The integrated shipping and alignment fixture for the multi-section wind turbine blade according to claim 9, wherein the laser targeting arrangement comprises:
    a laser sighting source mounted on at least one location on a support member at a non-connecting end of a first blade section;

though-holes on support members allowing, communication of the laser sighting source to the non-connecting end of a second blade section; and laser alignment targets on at least one the support members for the second blade section.

12. A method for shipping and aligning sections of a jointed multi-section wind turbine blade on an integrated shipping and aligning fixture including a first fixture with a fully detachable support section and a second fixture with a partially detachable support section the method comprising:

mounting individual sections of the multi-section wind turbine blade, including a root section and a tip section detached from the root section, on the first fixture and a second fixture, wherein the individual sections require alignment for assembly into a unit;

shipping the integrated shipping and alignment fixture to an assembly destination for the wind turbine blade;

detaching the tip section of the wind turbine blade from the fixture;

fully detaching the fully detachable support section from the first fixture;

positioning the fully detachable support section to mount a tip end of the tip section; and partially detaching the partially detachable support section from the second fixture.

13. The method for shipping and aligning sections of a multi-section wind turbine blade according to claim 12, the method further comprising:

mounting the tip end of the tip section on the fully detachable support section and mounting the connecting portion of the tip section to partially detachable support section;

aligning the connecting end of the tip section with the connecting end of the root section: and clamping the connecting end of the tip section to the connecting end of the root section.

14. The method for shipping and aligning sections of a multi-section wind turbine blade according to claim 13, the step of aligning further comprising:

aligning the tip section and the root section of the blade according to a laser sighting arrangement.

15. The method for shipping and aligning sections of a multi-section wind turbine blade according to claim 14, the step of aligning according to a laser sighting arrangement comprising:

performing laser sighting on laser sighting targets deployed on the fully detachable support section and on at least one of the first support fixture and the second support fixture; and adjusting the positioning of the tip section vertically and laterally to align the tip section with the root section based on the laser sighting targets.

* * * * *

UNITED STATES PATENT AND TRADEMARK OFFICE
CERTIFICATE OF CORRECTION

PATENT NO. : 8,240,962 B2  
APPLICATION NO. : 11/966305  
DATED : August 14, 2012  
INVENTOR(S) : Jamie Livingston and Dirk Jan Kootstra Page 1 of 1

It is certified that error appears in the above-identified patent and that said Letters Patent is hereby corrected as shown below:

On the Title Page

Item (57) Abstract, line 6: "supports on the the" should read --supports on the--

In the Claims

Column 11, line 1: "though-holes on support" should read --through-holes on support--

Column 11, line 6: "at least one the support" should read --at least one of the support--

Column 12, line 6: "root section: and" should read --root section; and--

Signed and Sealed this  
Twenty-fourth Day of September, 2013

Teresa Stanek Rea  
*Deputy Director of the United States Patent and Trademark Office*